(12) United States Patent
Hiramatsu et al.

(10) Patent No.: US 7,838,618 B2
(45) Date of Patent: Nov. 23, 2010

(54) PROCESS FOR THE PRODUCTION OF PHENYLENE ETHER OLIGOMER

(75) Inventors: Kiyonari Hiramatsu, Yokkaichi (JP); Yoshio Mukai, Yokkaichi (JP); Hidemi Hirashima, Yokkaichi (JP); Yuji Takeda, Yokkaichi (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 12/227,712

(22) PCT Filed: May 24, 2007

(86) PCT No.: PCT/JP2007/061041

§ 371 (c)(1),
(2), (4) Date: Nov. 25, 2008

(87) PCT Pub. No.: WO2007/139172

PCT Pub. Date: Dec. 6, 2007

(65) Prior Publication Data

US 2009/0176962 A1   Jul. 9, 2009

(30) Foreign Application Priority Data

May 25, 2006   (JP) .............................. 2006-144813

(51) Int. Cl.
*C09G 65/38* (2006.01)
*B32B 27/00* (2006.01)

(52) U.S. Cl. ........................ 528/214; 428/413; 525/370; 526/317.1; 528/361; 549/561; 568/660; 568/730

(58) Field of Classification Search ................. 428/413; 525/370; 526/317.1; 528/214, 361; 549/561; 568/660, 730
See application file for complete search history.

(56) References Cited

U.S. PATENT DOCUMENTS

| | | | |
|---|---|---|---|
| 4,246,398 A | 1/1981 | Sugio et al. | |
| 2003/0130438 A1* | 7/2003 | Amagai et al. | 525/370 |
| 2003/0229256 A1* | 12/2003 | Ishii et al. | 568/660 |
| 2004/0214004 A1* | 10/2004 | Amagai et al. | 428/413 |

FOREIGN PATENT DOCUMENTS

| | | |
|---|---|---|
| JP | 54-146896 | 11/1979 |
| JP | 2000-281798 | 10/2000 |
| JP | 2000-281799 | 10/2000 |
| JP | 2004-099681 | 4/2004 |
| JP | 2006-028111 | 2/2006 |

\* cited by examiner

*Primary Examiner*—Terressa M Boykin
(74) *Attorney, Agent, or Firm*—Wenderoth, Lind & Ponack, L.L.P.

(57) ABSTRACT

A process for producing a phenylene ether oligomer comprising oxidative polymerization of a specific bivalent phenol compound and a specific monovalent phenol compound in an aromatic hydrocarbon solvent, wherein the aromatic hydrocarbon solvent of a phenylene ether oligomer solution obtained after the termination of the polymerization is replaced with a water-soluble organic solvent having a boiling point higher than that of the aromatic hydrocarbon solvent and the resultant phenylene ether oligomer solution is brought into contact with water, thereby precipitating the phenylene ether oligomer as particles.

11 Claims, No Drawings

PROCESS FOR THE PRODUCTION OF PHENYLENE ETHER OLIGOMER

TECHNICAL FIELD

The present invention relates to a process for the production of a phenylene ether oligomer improved in solubility in a variety of solvents and compatibility with other resins.

BACKGROUND ARTS

At present, a high molecular weight phenylene ether compound, for example a polyphenylene ether resin (to be referred to as "PPE" hereinafter, for instance JP-B-S42-3195 and JP-B-S58-53012), is applied to electric and electronic material uses and constructional material uses since it shows excellent high frequency properties, heat resistance and flame resistance. That is, in addition to its excellent properties, PPE also has a phenolic hydroxyl group which is easily modifiable with a functional group in accordance with an intended use. However, the range of its usage is limited because PPE is poor in compatibility with a thermosetting resin such as an epoxy resin or a cyanate resin, which is used in the fields of electric and electronic materials, also poor in solubility in general-purpose solvents, and furthermore poor in compatibility with other plastics which are used for constructional materials. Therefore, the excellent properties of PPE are not exploited in a variety of fields. Accordingly, for example, a method of IPN (interpenetrating polymer network) structuralization with a cyanate resin (for example Japanese Patent No. 3261076), a method of converting a high-molecular weight PPE into a low-molecular weight PPE by means of a radical catalyst (for example Japanese Patent No. 3248424) and a method of oxidatively polymerizing a bivalent phenol compound and a monovalent phenol compound (for example JP-B-H8-011747) have been proposed for the purpose of expanding the usage range of PPE. Furthermore, a method of producing a phenylene ether oligomer by oxidative polymerization of a specific bisphenol compound and a specific monovalent phenol compound (for example JP-A-2003-12796) has been also studied. However, it is difficult to precipitate, as particles, a phenylene ether oligomer obtained by the above method. This is a problem in view of industrial manufacturing.

That is, generally, a polyphenylene ether resin is obtained in an aromatic hydrocarbon solution and alcohols such as methanol are used for forming particles thereof. When the same method is applied to a phenylene ether oligomer, a low molecular weight substance dissolves in an alcohol such as methanol so that it is impossible to obtain particles efficiently. Further, when water is added in order to decrease the solubility in an alcohol, precipitation of a viscous substance appears. Therefore, this method is also industrially inappropriate.

It is an object of the present invention to provide an industrial process for the production of a phenylene ether oligomer which utilizes the excellent electrical characteristics, heat resistance and flame resistance of a phenylene ether structure, has remarkably high compatibility with other resins and remarkably high solubility in general-purpose solvents and also has a phenolic hydroxyl group easily modifiable in accordance with an intended use, which process is capable of easily precipitating the phenylene ether oligomer as particles.

DISCLOSURE OF THE INVENTION

The present inventors have made diligent studies on the above problems and as a result noted that since the solubility of a phenylene ether oligomer, to be obtained, in an organic solvent is too high, it is very difficult to precipitate the phenylene ether oligomer. Then, the present inventors have found that, when an organic hydrocarbon solvent of an aromatic hydrocarbon solvent solution of a phenylene ether oligomer is replaced with a water-soluble organic solvent having a boiling point higher than the boiling point of the above organic hydrocarbon solvent and then the resultant solution is brought into contact with water, it is possible to precipitate the phenylene ether oligomer as particles. In addition, the present inventors have found that it is possible to recover and reuse the replaced organic hydrocarbon solvent, the water-soluble organic solvent contained in a filtrate which is discharged in accordance with the formation of the particles, and an alcohol which is used for removing the water-soluble organic solvent contained in the particles.

According to the present invention, there is provided a process for producing a phenylene ether oligomer comprising oxidatively polymerizing a bivalent phenol compound represented by the formula (1) and a monovalent phenol compound represented by the formula (2) in an aromatic hydrocarbon solvent, wherein the aromatic hydrocarbon solvent of a phenylene ether oligomer solution obtained after the termination of the polymerization is replaced with a water-soluble organic solvent having a boiling point higher than the boiling point of the aromatic hydrocarbon solvent and then the resultant phenylene ether oligomer solution is brought into contact with water, thereby precipitating the phenylene ether oligomer as particles.

According to the present invention, furthermore, there is provided a process for producing a phenylene ether oligomer, wherein an organic solvent used and the like are reused.

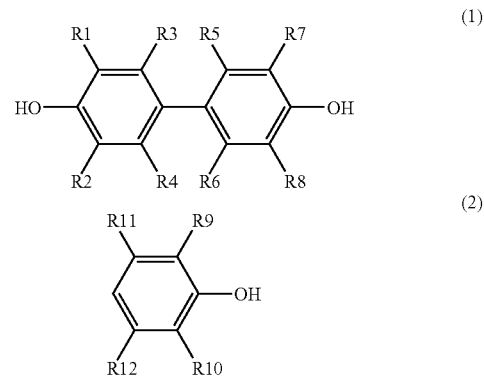

(wherein R1, R2, R3, R7, R8, R9 and R10 are the same or different and represent a halogen atom, an alkyl group having 6 or less carbon atoms or a phenyl group, and R4, R5, R6, R11 and R12 are the same or different and represent a hydrogen atom, a halogen atom, an alkyl group having 6 or less carbon atoms or a phenyl group).

MOST PREFERRED EMBODIMENT OF THE INVENTION

In the process for producing a phenylene ether oligomer, provided by the present invention, a bivalent phenol compound represented by the formula (1) and a monovalent phenol compound represented by the formula (2) are oxidatively polymerized in an aromatic hydrocarbon solvent to obtain the phenylene ether oligomer.

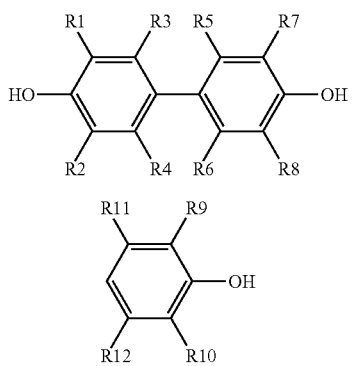

The bivalent phenol compound used in the present invention refers to a phenol compound of the formula (1) in which R1, R2, R3, R7 and R8 are the same or different and represent a halogen atom, an alkyl group having 6 or less carbon atoms or a phenyl group and R4, R5 and R6 are the same or different and represent a hydrogen atom, a halogen atom, an alkyl group having 6 or less carbon atoms or a phenyl group, provided that it is essential that each of R1, R2, R3, R7 and R8 is not a hydrogen atom. The above bivalent phenol compound can be used singly or a mixture of at least two bivalent phenol compounds can be used. Specifically, the above bivalent phenol compound is preferably 2,3,3',5,5'-pentamethyl-(1,1'-biphenyl)-4,4'-diol or 2,2',3,3',5,5'-hexamethyl-(1,1'-biphenyl)-4,4'-diol. In particular, 2,2',3,3',5,5'-hexamethyl-(1,1'-biphenyl)-4,4'-diol is more preferred.

The monovalent phenol compound used in the present invention refers to a phenol compound of the formula (2) in which R9 and R10 are the same or different and represent a halogen atom, an alkyl group having 6 or less carbon atoms or a phenyl group and R11 and R12 are the same or different and represent a hydrogen atom, a halogen atom, an alkyl group having 6 or less carbon atoms or a phenyl group. The monovalent phenol compound can be used singly or a mixture of at least two monovalent phenol compounds can be used. In particular, it is preferred to use singly a monovalent phenol compound of the formula (2) which has substituents at 2 and 6 positions or jointly use a monovalent phenol compound of the formula (2) which has substituents at 2 and 6 positions and a monovalent phenol compound of the formula (2) which has substituents at 2, 3 and 6 positions or 2, 3, 5 and 6 positions. Specifically, 2,6-dimethylphenol and 2,3,6-trimethylphenol are preferred. In particular, 2,6-dimethylphenol is more preferred.

The process of producing the phenylene ether oligomer in the present invention is similar to the processes of producing PPE disclosed in, for example, J-B-S42-3195 and JP-B-S58-53012. That is, a bivalent phenol compound represented by the formula (1) and a monovalent phenol compound represented by the formula (2) are oxidatively polymerized by the use of a catalyst comprising a combination of a salt of a metal and an amine, thereby obtaining a phenylene ether oligomer. The metal of the above metal salt is preferably copper or manganese, more preferably copper which has high catalytic activity. Further, it is possible to use, as a co-catalyst, a phase transfer catalyst disclosed in JP-B-S58-53012 in combination with the above catalyst comprising a combination of a salt of a metal and an amine. The oxidative polymerization is carried out with oxygen in the presence of the above catalyst. For example, it is carried out by a method in which an oxygen gas is directly introduced into a polymerization container or a method in which oxygen diluted with an inert gas is introduced into a polymerization container. The method of the oxidative polymerization is not specially limited to these methods. In view of safety, it is preferred that the concentration of oxygen is adjusted beyond the range of explosive limit of a solvent, to be used, by diluting air with an inert gas such as nitrogen and then the concentration-adjusted air is introduced into a polymerization container.

A reaction solvent for the oxidative polymerization is selected from organic hydrocarbons such as benzene, toluene and xylene which are stable in the oxidation reaction. In particular, toluene is preferred in view of safety and easy removal by vaporization. Furthermore, the phenylene ether oligomer to be obtained is excellent in the solubility in an organic solvent. Therefore, it is possible to use an alcohol such as methanol or ethanol, an aliphatic hydrocarbon such as hexane or heptane, a ketone such as acetone or methyl ethyl ketone, an ester such as ethyl acetate or an amide such as dimethylformamide, each of which is conventionally a poor solvent with regard to PPE and therefore inappropriate as a reaction solvent, in the polymerization in such an amount that the weight of the aromatic hydrocarbon at the time of the completion of the polymerization is in the range of 50% or more based on the total solvent weight. In particular, when 2,2',3,3',5,5'-hexamethyl-(1,1'-biphenyl)-4,4'-diol is used as the bivalent phenol compound, it is preferred to use a mixture of the aromatic hydrocarbon with methanol, which dissolves 2,2',3,3',5,5'-hexamethyl-(1,1'-biphenyl)-4,4'-diol relatively well.

In the present invention, the method of oxidatively polymerizing a bivalent phenol compound represented by the formula (1) and a monovalent phenol compound represented by the formula (2) is not specially limited. For example, it is typically a method in which the bivalent phenol compound and the monovalent phenol compound are charged together into a polymerization container and then oxidative polymerization is carried out with an oxygen-containing gas being introduced, a method in which the bivalent phenol compound and the monovalent phenol compound are continuously added to a polymerization container with an oxygen-containing gas being introduced to carry out oxidative polymerization or a method in which the bivalent phenol compound, the monovalent phenol compound and the catalyst comprising a metal salt and an amine are mixed in advance and the mixture is continuously added into a polymerization container to carry out oxidative polymerization. The temperature of the polymerization in the process of the present invention is not specially limited. Generally, the above polymerization temperature is preferably 10 to 60° C., more preferably 20 to 50° C. When the polymerization temperature is too low, a special supplementary device for cooling a polymerization container is required so that it is economically undesirable. When the polymerization temperature is too high, undesirably, a supplementary device for heating a polymerization container is required and, in addition, the load on a device which cools a vapor of solvent contained in an exhaust gas and recovers the solvent by condensation is increased since the amount of the above solvent vapor increases. This polymerization reaction is an exothermic reaction and it is required to remove the heat of a polymerization reaction solution for controlling the temperature inside a system within a certain range. A polymerization container jacket or an external circulating regenerator can be used for the removal of heat. Further, the removal of heat in the polymerization container can be carried out by means of latent heat of vaporization of a solvent contained in an exhaust gas of the oxygen-containing gas which is introduced into the polymerization container for the oxidation reaction. More preferably, the addition of an alcohol having a high latent heat of vaporization to the reaction solvent can increase the effect of the heat removal due to the solvent vaporized together with the exhaust gas.

The structure of the phenylene ether oligomer obtained by oxidative polymerization of the bivalent phenol compound of the formula (1) and the monovalent phenol compound of the formula (2) in the present invention comprises a compound represented by the formula (3) as a main component and a compound represented by the formula (4) as a byproduct.

pound and the bivalent phenol compound such that the number average molecular weight of the phenylene ether oligomer becomes 500 to 5,000, particularly preferably 500 to 3,000. Specifically, the mixing ratio of the monovalent phenol compound and the bivalent phenol compound in (the number of moles of monovalent phenol compound)/(the number of moles of bivalent phenol compound) is preferably 2 (mol/mol) to 30 (mol/mol).

In the process for producing a phenylene ether oligomer, provided by the present invention, a structure different from the structures of raw materials generates in the step of the

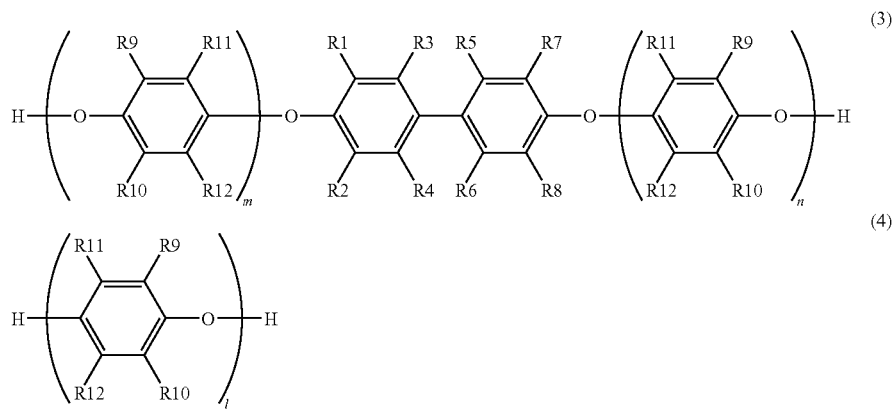

(3)

(4)

wherein R1, R2, R3, R7, R8, R9 and R10 are the same or different and represent a halogen atom, an alkyl group having 6 or less carbon atoms or a phenyl group, R4, R5, R6, R11 and R12 are the same or different and represent a hydrogen atom, a halogen atom, an alkyl group having 6 or less carbon atoms or a phenyl group, each of m and n represents an integer of 0 to 25, provided that at least one of m and n is not 0, and 1 represents an integer of 1 to 50.

The number average molecular weight of the phenylene ether oligomer obtained by the present invention is preferably 500 to 5,000, particularly preferably 500 to 3,000. When the number average molecular weight is smaller than the lower limit of the above range, the yield of the oligomer is low. When the number average molecular weight is larger than the upper limit of the above range, the solubility in a general-purpose solvent is poor. The number average molecular weight used in the present specification is defined as a number average molecular weight converted into polystyrene molecular weight, which is obtained by determining the correlation between the elution time of a standard polystyrene and the number average molecular weight of the standard polystyrene by means of a gel permeation chromatography (to be referred to as "GPC" hereinafter), determining the elution time of a phenylene ether oligomer by GPC, and determining the number average molecular weight of the polystyrene based on the elution time of the phenylene ether oligomer.

The molecular weight of the phenylene ether oligomer to be produced can be varied by changing the mixing ratio of the monovalent phenol compound and the bivalent phenol compound. When the amount of the monovalent phenol compound is larger than the amount of the bivalent phenol compound, the molecular weight of the phenylene ether oligomer increases. The mixing ratio of the monovalent phenol compound and the bivalent phenol compound can be decided as required. It is preferred to mix the monovalent phenol comoxidative polymerization in some cases. Specifically, it is typically a structure to which a methoxy group, an aldehyde group, a carbonyl group or the amine used for the catalyst is added. Although the generation of such different structure is unavoidable in the oxidative reaction, the physical properties of the phenylene ether oligomer to be obtained are scarcely impaired when the amount of the different structure is preferably 10 mol % or less, more preferably 5 mol % or less, based on the total number of moles of substituents of the raw material phenols.

In the present invention, the metal salt is removed from the polymerization reaction solution of the phenylene ether oligomer obtained by the oxidative polymerization and the polymerization reaction is terminated, thereby obtaining a phenylene ether oligomer solution. In this step, it is preferred that a chelating agent aqueous solution is brought into contact with the polymerization reaction solution, to extract the metal salt from the polymerization reaction solution into the aqueous solution. The chelating agent is not specially limited so long as it is a chelating agent which is capable of extracting the catalyst metal into an aqueous phase side by forming a complex with the catalyst metal. The chelating agent aqueous solution is preferably an aqueous solution containing an alkali metal salt of ethylene diamine tetraacetate or an alkali metal salt hydrate of ethylene diamine tetraacetate. More preferred examples of the chelating agent aqueous solution include an aqueous solution of disodium ethylenediamine tetraacetate, an aqueous solution of trisodium ethylenediamine tetraacetate and an aqueous solution of tetrasodium ethylenediamine tetraacetate. With regard to a contact time, when the dispersion state of the aqueous solution is homogeneous, a short period of time is sufficient for the contact and the contact time is one minute or more, preferably five minutes or more. The temperature for the contact is not specially limited so long as the temperature is in such a range that the phenylene ether oligomer does not precipitate from the polymerization reaction solution and the solvent does not boil. Generally, it is preferred that the contact is carried out at a temperature in the range of ±30° C. of the polymerization reaction temperature, because the installation of an excessive cooling or heating device is unnecessary.

When a mixture of the aromatic hydrocarbon solvent with a water-soluble organic solvent is used as the reaction solvent, the whole or part of the water-soluble organic solvent contained in the polymerization reaction solution is extracted into an aqueous solution side. When the water-soluble organic solvent mixed with the aromatic hydrocarbon solvent is used in the polymerization reaction, attention should be paid to the specific gravity of the chelating agent aqueous solution after the extraction of the water-soluble organic solvent. A difference in specific gravity after the contact with the chelating agent aqueous solution between the polymerization reaction solution and the chelating agent aqueous solution is preferably 0.001 or higher, more preferably 0.01 or higher. When the specific gravity of the chelating agent aqueous solution is smaller than that of the polymerization reaction solution, it is possible to carry out liquid-liquid separation of the chelating agent aqueous solution as a light liquid. When the specific gravity of the chelating agent aqueous solution is larger than that of the polymerization reaction solution, it is possible to carry out liquid-liquid separation of the chelating agent aqueous solution as a heavy liquid. The polymerization reaction solution of the phenylene ether oligomer and the chelating agent aqueous solution can be separated by allowing a mixture of the polymerization reaction solution and the chelating agent aqueous solution to stand after the termination of the contact, due to mixing, of the polymerization reaction solution and the chelating agent aqueous solution. For shortening the time required for the separation, it is preferred to use a continuous or batch centrifugal separation type liquid-liquid separator or a filter type liquid-liquid separator such as a coalescer.

Then, it is preferred that the polymerization reaction solution of the phenylene ether oligomer after the contact with the chelating agent aqueous solution is brought into contact with water, to extract a small amount of the metal salt remaining in the polymerization reaction solution. The method for separation of the polymerization reaction solution and the water can be selected from the above-mentioned separation methods for the chelating agent separation. The contact temperature and the temperature of the separation from the water are not specially limited. It is effective to carry out the above contact and the separation at 40° C. or higher, more preferably 80° C. or higher, for shortening the separation time. The above washing with water is carried out once or repeated two or more times. The washing with water is carried out until the amount of a catalyst metal residue in the polymerization reaction solution of the phenylene ether oligomer becomes 100 μg/g or less, preferably 50 μg/g or less, more preferably 100 μg/g or less, based on the amount of the phenylene ether oligomer. Further, the electrical conductivity of the water after the last washing with water is preferably 50 mS/m or less, more preferably 20 mS/m or less. When the number of the washings with water is two or more, part or the whole of water used in n-th washing can be reused in (n-1)-th washing. Part or the whole of the water after the first washing can be used for adjustment of the chelating agent aqueous solution to be used for the termination of the polymerization regardless of the number of the washings. Thus, the phenylene ether oligomer solution used in the present invention is obtained.

Then, a step of precipitating the phenylene ether oligomer as particles by replacing the aromatic hydrocarbon solvent of the phenylene ether oligomer solution of the present invention with a water-soluble organic solvent having a boiling point higher than the boiling point of the aromatic hydrocarbon and then bringing the resultant phenylene ether oligomer solution into contact with water, will be explained. In a general process for producing PPE, a polymerization reaction solution is directly brought into contact with an alcohol, thereby obtaining PPE particles. However, since a phenylene ether oligomer has a low molecular weight, the phenylene ether oligomer is soluble in a mixed solvent of an aromatic hydrocarbon and an alcohol. Therefore, when the phenylene ether oligomer solution is directly brought into contact with an alcohol, the yield of phenylene ether oligomer particles to be obtained is low and, in addition, a sticky educt generates, which causes a problem of difficulty in separating a solid. On the other hand, the above problem concerning the production of a solid of phenylene ether oligomer can be overcome by the method of precipitating a phenylene ether oligomer as particles, adopted in the present invention, by replacing the aromatic hydrocarbon solvent of the phenylene ether oligomer solution with a water-soluble organic solvent having a boiling point higher than the boiling point of the aromatic hydrocarbon and bringing the phenylene ether oligomer solution after the replacement into contact with water.

The water-soluble organic solvent used for the above replacement of the solvents has a boiling point higher than that of the aromatic hydrocarbon solvent used for the reaction solvent. Specifically, the water-soluble organic solvent is preferably dimethylformamide, N,N-dimethylacetamide, N-methylpyrrolidone or dimethylsulfoxide. In particular, N,N-dimethylacetamide is more preferred in view of handling properties. In the replacement of the solvents, a mixture obtained by mixing the phenylene ether oligomer solution and the water-soluble organic solvent is introduced into distilling equipment or the phenylene ether oligomer solution and the water-soluble organic solvent are separately introduced into distilling equipment, and the aromatic hydrocarbon solvent is vaporized and removed in a batch method or a continuous method by heating under atmospheric pressure or under reduced pressure to replace the aromatic hydrocarbon solvent with the water-soluble organic solvent, whereby a water-soluble organic solvent solution of the phenylene ether oligomer is obtained. The temperature of a heating medium for the above heating is preferably 180° C. or less, more preferably 160° C. or less, for inhibiting a decrease in the molecular weight of the phenylene ether oligomer due to thermal decomposition. In addition, when the temperature of the heating medium is lower than 90° C., unpractically, vaporization efficiency is low. Therefore, the temperature of the heating medium is preferably in the range of from 90° C. to 160° C. From these reasons, it is preferred that the operation of the removal by vaporization is carried out under reduced pressure.

It is preferred that the amount of an aromatic hydrocarbon residue in the phenylene ether oligomer water-soluble organic solvent solution after the replacement of the solvents is small since the above residue converts the phenylene ether oligomer into a sticky educt at the time of the formation of particles with water, to be described later. Specifically, the amount of the aromatic hydrocarbon residue is 5% by weight or less, preferably 2% by weight or less, more preferably 1% by weight or less, based on the phenylene ether oligomer. Further, most of the amine used for the oxidative polymerization is simultaneously removed at the time of the removal of the aromatic hydrocarbon by vaporization.

In the present invention, a mixed solution containing the aromatic hydrocarbon solvent distilled off and recovered at the solvent replacement and the amine used for the oxidative polymerization can be reused for polymerization by removing water dispersed in the mixed solution. The above water can be separated by allowing a distillate to stand. For shortening the time required for the separation, a continuous or batch centrifugal separation type liquid-liquid separator or a filter type liquid-liquid separator such as a coalescer can be used. The temperature for the above separation operation is not specially limited so long as it is the boiling point of the aromatic hydrocarbon or lower and also is the melting point of the water or higher. It is preferred to carry out the separation operation at 40° C. or lower, at which the solubility of water in the aromatic hydrocarbon becomes small. More preferably, it is from 5° C. to 30° C.

Then, a step of the formation of particles in which particles of the phenylene ether oligomer are precipitated by bringing the phenylene ether oligomer solution after the replacement of the solvents into contact with water, will be explained. The contact with water can be carried out by, for example, a method in which the phenylene ether oligomer solution alone or together with water is added to a solidification container containing water or a mixed solution of water and a water-soluble organic solvent, and the phenylene ether oligomer solution is stirred in the solidification container under conditions where the phenylene ether oligomer solution is homogeneously mixed with the water, to form particles. In this case, the amount of the water-soluble organic solvent is preferably in the range of from 20 to 80% by weight, more preferably from 40 to 70% by weight, based on the total amount of the water and the water-soluble organic solvent. When the amount of the organic solvent is larger than the upper limit of the above range, undesirably, the formation of particles does not advance well even if mixing is homogeneously carried out in the solidification container, which causes the generation of a scale in the container or a decrease in the yield of a solid. When the amount of the organic solvent is smaller than the lower limit of the above range, undesirably, a large amount of water is used and, in addition, the particle diameter of particles to be obtained becomes smaller than the lower limit of a suitable range. The electrical conductivity of the water used for the formation of particles becomes better as the amount of ionic impurities decreases. Therefore, it is required to use an ion-exchanged water having an electrical conductivity of 2 mS/m or lower. It is preferred to use an ion-exchanged water having an electrical conductivity of 1 mS/m or lower, more preferably 0.5 mS/m or lower. When an ion-exchanged water having a high electrical conductivity is used, undesirably, the amount of ionic impurities remaining in the phenylene ether oligomer particles becomes large.

The above operation can be carried out by either of a batch operation and a continuous operation. The time for the contact with the water is at least 30 seconds or more, preferably 60 seconds or more. A long-time contact causes pulverization of the phenylene ether oligomer particles because of a stirring blade. Therefore, in an optimal method, a retention time is within 1 hour with a continuous solidification vessel. Although the retention time is apt to be long in the batch type particle formation, it is preferred to limit a stirring time to no more than 6 hours. Although the method of stirring and the shape of a stirring blade are not specially limited, it is required to homogeneously circulate and mix the phenylene ether oligomer solution, which is added, and the phenylene ether oligomer particles, which have been already formed, in the solidification container. When the circulation is insufficient, the added phenylene ether oligomer solution adheres a bottom of the solidification container or a stirring blade before it is dispersed in the container. In this case, since particles are formed in an adherence portion, a problem is that such particles become scales in the container. The temperature of the particle formation is 10 to 90° C., preferably 30 to 70° C. The particle diameter of the phenylene ether oligomer particles obtained here can be controlled by means of the shape of a stirring blade, the dynamic power of stirring and a stirring time. An average particle diameter thereof is preferably 10 to 1,000 μm, more preferably 10 to 500 μm, in view of handling of the phenylene ether oligomer particles. The phenylene ether oligomer particles are obtained as a slurry solution in which the particles are dispersed in a liquid so that the phenylene ether oligomer particles are subsequently separated from the solution by solid-liquid separation. The method of the solid-liquid separation is not specially limited. It is possible to select a filtering method which separates a solid and a liquid through a filter material or a centrifugal separation method which utilizes centrifugal force.

The phenylene ether oligomer particles separated by the solid-liquid separation are subsequently washed to remove impurities, such as a water-soluble organic solvent residue, contained in the particles. The washing method is typically a method in which a wash is continuously passed through the separated particles to wash the particles (rinse washing) or a method in which the separated particles and a wash are mixed and then solid-liquid separation is carried out again (re-slurrying washing). The rinse washing and the re-slurrying washing can be carried out singly or in combination. Further, the rinse washing and the re-slurrying washing can be carried out once or repeated two times or more. As the wash, it is possible to use water alone or an alcohol aqueous solution containing a water-soluble alcohol selected from methanol, ethanol, propanol and butanol and water in arbitrary proportions. Although the impurities such as a water-soluble organic solvent residue can be removed using the water alone, it is more preferred to use the alcohol aqueous solution as the wash because the washing efficiency increases. The alcohol to be used is not limited when it is selected from the above alcohols. Methanol, which is inexpensive, is preferred in view of industrial production. With regard to the concentration of the alcohol aqueous solution, a composition having the following solubility is preferred. A mixture of the alcohol and the water where the solubility of the phenylene ether oligomer in the wash is 5 g/100 g-wash or less is preferred and a combination where the solubility is 2 g/100 g-wash or less is more preferred. When methanol is used, the concentration of the methanol is preferably from 10% by weight to 90% by weight, more preferably from 20% by weight to 60% by weight. When the above solubility is more than 5 g/100 g-wash, the amount of the phenylene ether oligomer which dissolves in or outflows into the wash increases so that a decrease in yield occurs.

The amount of the water-soluble organic solvent which remains after the washing is 10% by weight or less, preferably 5% by weight or less, more preferably 1% by weight or less, based on the precipitated phenylene ether oligomer particles. The amount of the wash to be used is not specially limited so long as the amount of the water-soluble organic solvent residue is in a preferable range. The amount of the wash is preferably 10 to 100 times the weight of the phenylene ether oligomer. When the residual amount of the water-soluble organic solvent is 30% by weight or more, the rinse washing is effective. When it is smaller than 10% by weight, the re-slurrying washing is effective. The washing temperature is not specially limited so long as it is from 10 to 90° C. The washing temperature is preferably in the range of from 30 to 70° C. A catalyst residue and a polymerization byproduct are removed together with the water-soluble organic solvent by the solid-liquid separation operation. The electrical conductivity of the water used for the washing becomes better as the amount of ionic impurities decreases. Therefore, it is required to use an ion-exchanged water having an electrical conductivity of 2 mS/m or lower. It is preferred to use an ion-exchanged water having an electrical conductivity of 1 mS/m or lower, more preferably 0.5 mS/m or lower. When an ion-exchanged water having a high electrical conductivity is used, undesirably, the amount of ionic impurities remaining in the phenylene ether oligomer particles becomes large. When the number of the washings is two or more, part or the whole of a wash used in n-th washing can be reused as a wash of (n-1)-th washing. Owing to the above operation, the phenylene ether oligomer particles can be obtained in high yield.

A liquid component discharged by the solid-liquid separation and the wash which has washed the obtained particles are subjected to distillation to recover the alcohol, water and the water-soluble organic solvent. These can be used as recovered solvents for the next polymerization, particle formation and particle washing. In the recovery-distillation step, the water-soluble organic solvent and water discharged by the solid-liquid separation are mixed with the alcohol and water discharged as the wash and then the resultant mixture is introduced into distilling equipment or the water-soluble organic solvent and water discharged by the solid-liquid separation and the alcohol and water discharged as the wash are separately introduced into distilling equipment. Then, fractional distillation can be carried out in a batch method by heating the mixture under ordinary pressure or reduced pressure. The distillation is not limited so long as it is carried out under practical conditions. When a water-soluble organic solvent having a high boiling point is distilled, distillation under reduced pressure is preferred in order to improve efficiency. When the wash is a methanol aqueous solution, it is possible to fractionally distillate the methanol, water and the water-soluble aqueous solution subsequently to the first fraction. In this case, a methanol water or a water-soluble organic solvent aqueous solution other than isolated solvents can be recovered and reused if the concentration thereof is controlled. The methanol water or the water-soluble organic solvent aqueous solution can be mixed with the next distillate and then used again for a recovery step.

A cake of the phenylene ether oligomer particles obtained by the washing can be dehydrated by heating (drying) or dissolving it in a water-insoluble aromatic hydrocarbon. The drying can be carried out under atmosphere of air, an inactive gas or a mixed gas of air and an inactive gas. In particular, it is preferred to carry out the drying under a nitrogen atmosphere. The drying is preferably carried out in a temperature range of from 40 to 160° C. When the temperature is lower than the lower limit of the above range, undesirably, the time for the drying becomes long. When it is higher than the upper limit of the above range, undesirably, the phenylene ether oligomer particles undergo melting. The method of the drying is selected from known methods such as flash drying under ordinary pressure or vacuum-drying in a range of from 1 to 700 Torr. The drying can be carried out by a batch method or a continuous method. It is preferred to carry out the drying until the amount of a volatile component remaining in the phenylene ether oligomer particles is 5% or less, more preferably 1% by weight or less. The amount of the volatile component is defined as a weight loss amount obtained after carrying out vacuum-drying with a vacuum dryer under full vacuum at 120° C. for 24 hours. Further, the volatile component comprises water and the water-soluble organic solvent residue as main components. In the dehydration with the water-insoluble aromatic hydrocarbon, the phenylene ether oligomer is dissolved in the water-insoluble aromatic hydrocarbon such that the concentration of the phenylene ether oligomer is 10 to 60% by weight. Separated water is removed by means of liquid-liquid separation and/or vaporization of the water by heating the phenylene ether oligomer solution under ordinary pressure or reduced pressure.

The phenylene ether oligomer obtained by the present invention can be used alone. Otherwise, the phenylene ether oligomers which are different from each other in molecular weight can be mixed in arbitrary proportions or the phenylene ether oligomer can be mixed with the raw material bivalent phenol compound in arbitrary proportions before use. The phenylene ether oligomer obtained by the present invention is used as it is, or it is used after dissolving it in a solvent. Furthermore, an OH group, which is highly reactive, of the phenylene ether oligomer can be modified before use. The above modification reaction of an OH group is not specially limited. Examples thereof include a method of modifying an OH group into a glycidyl group by means of a reaction with epichlorohydrin, a method of modifying an OH group into a methyl styrene group by means of a reaction with chloromethylstyrene, a method of modifying an OH group into an acid anhydride group by means of a reaction with a pyromellitic acid, a trimellitic acid or derivatives of these and a method of modifying an OH group into a cyanate group by means of a reaction with cyanogen chloride.

EXAMPLES

The present invention will be concretely explained with reference to Synthetic Examples, Examples and Comparative Examples, while the present invention shall not be specially limited to the following Examples. With regard to agents used in these Examples, 2,2',3,3',5,5'-hexamethyl-(1,1'biphenyl)-4,4'-diol had a purity of 98% and contained as impurities a compound in which at least one molecule of 2,3,6-trimethylphenol was bonded to 2,2',3,3',5,5'-hexamethyl-(1,1'biphenyl)-4,4'-diol. 2,6-dimethylphenol had a purity of 99% and contained methyl phenol and trimethyl phenol as impurities.

The polymerization yield of a phenylene ether oligomer was obtained as follows. The recovery amount of a phenylene ether oligomer was determined from the amount of an extracted toluene solution and the weight of a vacuum-dried sample in the toluene solution, and the polymerization yield was determined on the basis of a ratio between the recovery amount of the phenylene ether oligomer and a theoretical yield based on charged monomers.

A yield after the formation of particles was obtained from the concentration of a phenylene ether oligomer in a charged N,N-dimethylacetamide solution and the weight of the phenylene ether oligomer after particle formation and drying.

With regard to a molecular weight, a number average molecular weight was obtained as a molecular weight calculated as polystyrene from the elution time of a standard polystyrene with GPC. With regard to specific measuring devices, a GPC system supplied by Shimadzu Corporation and GPCKF-801, GPCKF-802, GPCKF-803 and GPCKF-804 as a packed column for GPC were used. Measurement was carried out at 40° C. with a differential refractometer detector using a THF solution.

Synthetic Example 1

A 200-L jacket-attached polymerization furnace made of SUS316 (partially SUS304) and equipped with a stirrer, a thermometer, baffleplates, a gas-introducing tube, an exhaust gas condenser tube and an exhaust gas oxygen concentration measuring device was charged with 4,089 g of 2,2',3,3',5,5'- hexamethyl-(1,1'-biphenyl)-4,4'-diol, 7,390 g of 2,6-dimethylphenol, 89 kg of toluene, 47 kg of methanol, 625 g of N-butyldimethylamine, 60 g of N,N'-di-t-butylethylenediamine and 51 g of cupric bromide under a nitrogen atmosphere. Stirring was started. Hot water was injected into the jacket and the temperature inside the polymerization furnace was controlled at 40° C. After the temperature became stable, introduction of an air diluted with nitrogen, which had an oxygen concentration of 8%, at 8.5 Nm3/hr was started to initiate polymerization. After 230 minutes from the initiation of the polymerization, the oxygen concentration of an exhaust gas started increasing by 0.5% so that the introduction of the diluted air was terminated. 47 kg of a sodium ethylenediamine tetraacetate aqueous solution containing 380 g of sodium ethylenediamine tetraacetate was added to terminate the polymerization. The resultant mixture was allowed to stand in the polymerization furnace to separate an organic phase and an aqueous phase, and the aqueous phase was removed. 45 kg of an ion-exchanged water was added, the ion-exchanged water was mixed with the organic phase by stirring and the thus-obtained mixture was allowed to stand, thereby separating an organic phase and an aqueous phase. This water-washing operation was repeated twice, to obtain a toluene solution of 11.1% by weight of a phenylene ether oligomer. Part of the toluene solution was concentrated and solidified by drying with an evaporator and then it was vacuum-dried in an enclosed type vacuum drying machine under full vacuum at 120° C. for 48 hours. As a result thereof, a polymerization yield was 98% and a number average molecular weight was 989.

Synthetic Example 2

A toluene solution of 10.8% by weight of a phenylene ether oligomer was obtained in the same manner as in Synthetic Example 1 except that 4,089 g of 2,2',3,3',5,5'-hexamethyl-(1,1'-biphenyl)-4,4'-diol and 7,390 g of 2,6-dimethylphenol charged in the polymerization furnace in Synthetic Example 1 were replaced with 909 g of 2,2',3,3',5,5'-hexamethyl-(1,1'-biphenyl)-4,4'-diol and 10,264 g of 2,6-dimethylphenol. Part of the toluene solution was dried in the same manner as in Synthetic Example 1. As a result thereof, a polymerization yield was 97% and a number average molecular weight was 3,421.

Example 1

450 g of N,N-dimethylacetamide (DMAC, hereinafter) was added to 1,000 g of the toluene solution of the phenylene ether oligomer obtained in Synthetic Example 1. Continuous distillation was carried out with a distillation column, of which the column diameter was 25 mm and the number of theoretical column plates was 15 (7 upper plates and 8 lower plates), at a furnace temperature (heating medium temperature) of 115° C. under a distillation column top pressure of 10 Torr, thereby obtaining an N,N'-dimethylacetamide solution of the phenylene ether oligomer. As averages in continuous distillation for 6 hours, the feeding amount was 199 g/hr, the extraction amount from a distillation column bottom was 77 g/hr, the reflux ratio was 0.24 and the retention time inside a furnace was 5.0 hours. The concentration of the phenylene ether oligomer was 20.8% by weight and the residual amount of toluene was 0.9% by weight based on the phenylene ether oligomer. A whitish-cloudy distillate was obtained from the topside of the distillation column. The distillate was allowed to stand for separation, thereby obtaining a mixed solution containing 99.3% by weight of toluene, 0.7% by weight of N-butyldimethylamine and 0.04% by weight of water. The recovery of toluene was 98.5% and the recovery of N-butyldimethylamine was 98.5%. Then, 400 g of the N,N'-dimethylacetamide solution of the phenylene ether oligomer was added to a reciprocat stirring type solidification vessel containing 400 g of an ion-exchanged water with stirring, to carry out the formation of particles. In this formation of particles, a slurry of phenylene ether oligomer particles was obtained without any adherence of a solid inside the solidification vessel. The thus-obtained phenylene ether oligomer particles were filtered, washed with 1,000 g of a 30% by weight methanol aqueous solution and dried with a vacuum dryer at 120° C. for 24 hours. The yield of the thus-obtained phenylene ether oligomer particles was 96% and the number average molecular weight thereof was 1,020.

A liquid component separated by the liquid-solid separation was mixed with the methanol aqueous solution used for the washing of the obtained particles. The mixture was subjected to batch distillation using a distillation column, of which the column diameter was 25 mm and the number of theoretical column plates was 21.3, at a column top temperature of 63-64° C. under a distillation column top pressure of atmospheric pressure, to obtain at least 98% by weight of methanol. The recovery of the methanol was 91%. Distillation was continued at a column top temperature of 28 to 60° C. under a distillation column top pressure of 150 Torr, to distill methanol/water/DMAC off, and then continued at a column top temperature of 91 to 93° C. under a distillation column top pressure of 70 Torr, to obtain at least 99% by weight of dimethylacetamide as a water-soluble organic solvent. The recovery of the dimethylacetamide was 84%.

Example 2

An N,N-dimethylacetamide solution of a phenylene ether oligomer was obtained in the same manner as in Example 1 except that the toluene solution of the phenylene ether oligomer used in Example 1 was replaced with the toluene solution of the phenylene ether oligomer obtained in Synthetic Example 2. As averages in continuous distillation for 6 hours, the feeding amount was 203 g/hr, the extraction amount from a distillation column bottom was 79 g/hr, the reflux ratio was 0.24 and the retention time inside a furnace was 4.8 hours. The phenylene ether oligomer concentration was 19.7% by weight and the residual amount of toluene was 0.5% by weight based on the phenylene ether oligomer. A whitish-cloudy distillate was obtained from the topside of the distillation column. The distillate was allowed to stand for separation, thereby obtaining a mixed solution containing 99.3% by weight of toluene, 0.7% by weight of N-butyldimethylamine and 0.03% by weight of water. The recovery of toluene was 98.7% and the recovery of N-butyldimethylamine was 98.7%. Then, the formation of particles was carried out in the same manner as in Example 1, to obtain phenylene ether oligomer particles. Adherence of a solid did not occur inside the solidification vessel. Washing and drying were carried out in the same manner as in Example 1 except that a 50% by weight methanol aqueous solution was used as a wash for the above obtained particles. The yield of the phenylene ether oligomer particles was 98% and the number average molecular weight thereof was 3,440.

A liquid component separated by the liquid-solid separation was mixed with the methanol aqueous solution used for the washing of the obtained particles. The mixture was subjected to batch distillation using a distillation column, of which the column diameter was 25 mm and the number of theoretical column plates was 21.3, at a column top temperature of 63-64° C. under a distillation column top pressure of atmospheric pressure, thereby obtaining at least 98% by weight of methanol. The recovery of the methanol was 92%. Distillation was continued at a column top temperature of 28 to 60° C. under a distillation column top pressure of 150 Torr, to distill methanol/water/DMAC off, and then continued at a column top temperature of 91 to 93° C. under a distillation column top pressure of 70 Torr, to obtain at least 99% by weight of dimethylacetamide as a water-soluble organic solvent. The recovery of the dimethylacetamide was 85%.

Example 3

An N,N-dimethylacetamide solution of a phenylene ether oligomer was obtained by carrying out continuous-distillation in the same manner as in Example 1 except that the furnace temperature (heating medium temperature) was changed to 130° C. and the distillation column top pressure was changed to 60 Torr. As averages in continuous distillation for 6 hours, the feeding amount was 206 g/hr, the extraction amount from a distillation column bottom was 80 g/hr, the reflux ratio was 0.35 and the retention time inside a furnace was 4.9 hours. The phenylene ether oligomer concentration was 19.9% by weight and the residual amount of toluene was 1.1% by weight based on the phenylene ether oligomer. Thereafter, the same procedures as those in Example 1 were carried out, to obtain phenylene ether oligomer particles. Adherence of a solid did not occur inside the solidification vessel. The yield of the phenylene ether oligomer particles was 98% and the number average molecular weight thereof was 1,002.

Example 4

An N,N-dimethylacetamide solution of a phenylene ether oligomer was obtained by carrying out continuous-distillation in the same manner as in Example 1 except that the furnace temperature was changed to 160° C. and the distillation column top pressure was changed to 200 Torr. As averages in continuous distillation for 6 hours, the feeding amount was 200 g/hr, the extraction amount from a distillation column bottom was 75 g/hr, the reflux ratio was 0.52 and the retention time inside a furnace was 4.7 hours. The phenylene ether oligomer concentration was 20.9% by weight and the residual amount of toluene was 0.4% by weight based on the phenylene ether oligomer. Thereafter, the same procedures as those in Example 1 were carried out, to obtain phenylene ether oligomer particles. Adherence of a solid did not occur inside the solidification vessel. The yield of the phenylene ether oligomer particles was 99% and the number average molecular weight thereof was 998.

Example 5

An N,N-dimethylacetamide solution of a phenylene ether oligomer was obtained by carrying out continuous-distillation in the same manner as in Example 1 except that the furnace temperature was changed to 200° C. and the distillation column top pressure was changed to atmospheric pressure. As averages in continuous distillation for 6 hours, the feeding amount was 201 g/hr, the extraction amount from a distillation column bottom was 77 g/hr, the reflux ratio was 0.95 and the retention time inside a furnace was 5.1 hours. The phenylene ether oligomer concentration was 20.2% by weight and the residual amount of toluene was 0.4% by weight based on the phenylene ether oligomer. Thereafter, the same procedures as those in Example 1 were carried out, to obtain phenylene ether oligomer particles. Adherence of a solid did not occur inside the solidification vessel. The yield of the phenylene ether oligomer particles was 98% and the number average molecular weight thereof was 965.

Synthetic Example 3

A toluene solution of 11.2% by weight of a phenylene ether oligomer was obtained in the same manner as in Synthetic Example 1 except that the toluene charged in the polymerization furnace in Synthetic Example 1 was replaced with 91.8 kg of the recovered toluene solution obtained in Example 1 and N-butyldimethylamine was not added. Part of the thus-obtained toluene solution was dried in the same manner as in Synthetic Example 1. As a result thereof, a polymerization yield was 99% and a number average molecular weight was 992.

Example 6

450 g of the N,N-dimethylacetamide recovered in Examples 1 and 2 was added to 1,000 g of the toluene solution of the phenylene ether oligomer obtained in Synthetic Example 3. Continuous distillation was carried out with a distillation column, of which the column diameter was 25 mm and the number of theoretical column plates was 15 (7 upper plates and 8 lower plates), at a furnace temperature (heating medium temperature) of 115° C. under a distillation column top pressure of 10 Torr, to obtain an N,N'-dimethylacetamide solution of a phenylene ether oligomer. As averages in continuous distillation for 6 hours, the feeding amount was 200 g/hr, the extraction amount from a distillation column bottom was 78 g/hr, the reflux ratio was 0.24 and the retention time inside a furnace was 5.0 hours. The concentration of the phenylene ether oligomer was 20.4% by weight and the residual amount of toluene was 0.7% by weight based on the phenylene ether oligomer. A whitish-cloudy distillate was obtained from the topside of the distillation column. The distillate was allowed to stand for separation, thereby obtaining a mixed solution containing 99.2% by weight of toluene, 0.7% by weight of N-butyldimethylamine and 0.05% by weight of water. The recovery of toluene was 98.6% and the recovery of N-butyldimethylamine was 98.6%. Then, 400 g of the N,N'-dimethylacetamide solution of the phenylene ether oligomer was added to a reciprocat stirring type solidification vessel containing 400 g of an ion-exchanged water with stirring, to carry out the formation of particles. In this formation of particles, a slurry of phenylene ether oligomer particles was obtained without any adherence of a solid inside the solidification vessel. The thus-obtained phenylene ether oligomer particles were filtered, washed with 1,000 g of a 30% by weight methanol aqueous solution, prepared by using the methanol recovered in Examples 1 and 2, and dried with a vacuum dryer at 120° C. for 24 hours. The yield of the thus-obtained phenylene ether oligomer particles was 97% and the number average molecular weight thereof was 1,005.

A liquid component separated by the liquid-solid separation was mixed with the methanol aqueous solution used for the washing of the obtained particles. The mixture was subjected to batch distillation using a distillation column, of which the column diameter was 25 mm and the number of theoretical column plates was 21.3, at a column top temperature of 63-64° C. under a distillation column top pressure of atmospheric pressure, to obtain at least 98% by weight of methanol. The recovery of the methanol was 92%. Distillation was continued at a column top temperature of 28 to 60° C. under a distillation column top pressure of 150 Torr, to distill methanol/water/DMAC off, and then continued at a column top temperature of 91 to 93° C. under a distillation column top pressure of 70 Torr, to obtain at least 99% by weight of dimethylacetamide as a water-soluble organic solvent. The recovery of the dimethylacetamide was 85%.

Comparative Example 1

200 g of the toluene solution of the phenylene ether oligomer obtained in Synthetic Example 1 was added to a reciprocat stirring type solidification vessel containing 400 g of a solvent for the formation of particles with stirring, to carry out the formation of particles. Methanol, ethanol or isopropanol was used as the solvent for the formation of particles. In every case where methanol, ethanol or isopropanol was used as the solvent for the formation of particles, the phenylene ether oligomer became a sticky educt and adhered to stirring blades and wall of a solidification vessel. While the inside of the solidification vessel was washed with the solvent for the formation of particles, phenylene ether oligomer particles were recovered. The yield was 78% and the number average molecular weight was 1,237. A low-molecular weight substance was dissolved and eluted in the solvent for the particle formation so that a loss occurred.

Comparative Example 2

The formation of particles was carried out in the same manner as in Comparative Example 1 except that the toluene solution of the phenylene ether oligomer obtained in Synthetic Example 2 was used. In every case where methanol, ethanol or isopropanol was used as the solvent for the formation of particles, the phenylene ether oligomer became a sticky educt and adhered to stirring blades and wall of a solidification vessel. While the inside of the solidification vessel was washed with the solvent for the formation of particles, phenylene ether oligomer particles were recovered. The yield was 81% and the number average molecular weight was 3,848. A low-molecular weight substance was dissolved and eluted in the solvent for the particle formation so that a loss occurred.

Comparative Example 3

A 200-L jacket-attached polymerization furnace made of SUS316 (partially SUS304) and equipped with a stirrer, a thermometer, baffleplates, a gas-introducing tube, an exhaust gas condenser tube and an exhaust gas oxygen concentration measuring device was charged with 7,390 g of 2,6-dimethylphenol, 89 kg of toluene, 47 kg of methanol, 625 g of N-butyldimethylamine, 60 g of N,N'-di-t-butylethylenediamine and 51 g of cupric bromide under a nitrogen atmosphere. Stirring was started. Hot water was injected into the jacket and the temperature inside the polymerization furnace was controlled at 40° C. After the temperature became stable, introduction of an air diluted with nitrogen, which had an oxygen concentration of 8%, at 8.5 Nm3/hr was started to initiate polymerization. After 225 minutes from the initiation of the polymerization, the oxygen concentration of an exhaust gas started increasing by 1.0% so that the introduction of the diluted air was terminated. 47 kg of a sodium ethylenediamine tetraacetate aqueous solution containing 380 g of sodium ethylenediamine tetraacetate was added to terminate the polymerization. The resultant mixture was allowed to stand in the polymerization furnace to separate an organic phase and an aqueous phase, and the aqueous phase was removed. 45 kg of an ion-exchanged water was added, the ion-exchanged water was mixed with the organic phase by stirring and the thus-obtained mixture was allowed to stand, thereby separating an organic phase and an aqueous phase. This water-washing operation was repeated twice, to obtain a toluene solution of 7.6% by weight of pophenylene ether. Part of the toluene solution was concentrated and solidified by drying with an evaporator and then it was vacuum-dried in an enclosed type vacuum drying machine under full vacuum at 120° C. for 48 hours. As a result thereof, a polymerization yield was 99% and a number average molecular weight was 14,000.

310 g of N,N-dimethylacetamide was added to 1,000 g of the thus-obtained toluene solution of the polyphenylene ether. In this case, the resultant solution was suspended and precipitation of a sticky educt was observed. Further, attempts were carried out to directly feed the suspended solution to distillation equipment of which the column diameter was 25 mm and the number of theoretical column plates was 15 (7 upper plates and 8 lower plates). However, a pump stopped so that the replacement of solvents could not be carried out. Then, part of the suspended toluene-dimethylacetamide solution was placed in a short-neck flask and the replacement of solvents was simply carried out with an evaporator. However, it became a suspension having higher viscosity as toluene was distilled off, so that it could not be taken out.

INDUSTRIAL UTILITIES

According to the present invention, it is possible to industrially produce a phenylene ether oligomer which utilizes the excellent electrical characteristics, heat resistance and flame resistance of a phenylene ether structure, has remarkably high compatibility with other resins and remarkably high solubility in general-purpose solvents and also has a phenolic hydroxyl group easily modifiable in accordance with an intended use. Development to a terminal-group-modified phenylene-ether-structure-containing compound becomes practical. Furthermore, the phenylene ether oligomer can be supplied at a lower price by recovering and reusing the aromatic hydrocarbon solvent, the water-soluble organic solvent, etc.

The invention claimed is:

1. A process for producing a phenylene ether oligomer comprising oxidative polymerization of a bivalent phenol compound represented by formula (1) and a monovalent phenol compound represented by formula (2) in an aromatic hydrocarbon solvent, wherein the aromatic hydrocarbon solvent of the phenylene ether oligomer solution obtained after the termination of the polymerization is replaced with a water-soluble organic solvent having a boiling point higher than the boiling point of the aromatic hydrocarbon solvent to obtain a phenylene ether oligomer water-soluble organic solvent solution, and the phenylene ether oligomer water-soluble organic solvent solution is brought into contact with water, thereby precipitating the phenylene ether oligomer as particles,

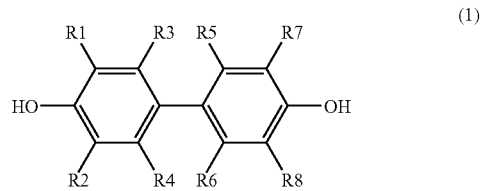

-continued

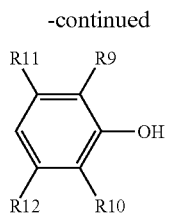

(2)

wherein R1, R2, R3, R7, R8, R9 and R10 are the same or different and represent a halogen atom, an alkyl group having 6 or less carbon atoms or a phenyl group, and R4, R5, R6, R11 and R12 are the same or different and represent a hydrogen atom, a halogen atom; an alkyl group having 6 or less carbon atoms or a phenyl group, wherein the aromatic hydrocarbon solvent is toluene, the water-soluble organic solvent is at least one selected from the group consisting of dimethylformamide, N,N-dimethylacetamide, N-methylpyrrolidone and dimethylsulfoxide, and a heating vaporization operation is carried out at a heating temperature of 90° C. to 160° C. in the replacement of the aromatic hydrocarbon solvent with the water-soluble organic solvent.

2. A process according to claim 1, wherein the bivalent phenol compound represented by formula (1) is 2,2',3,3',5,5'-hexamethyl-(1,1'-biphenyl)-4,4'-diol and the monovalent phenol compound represented by formula (2) is 2,6-dimethylphenol.

3. A process according to claim 1, wherein the phenylene ether oligomer has a number average molecular weight of 500 to 5,000.

4. A process according to claim 1, wherein the oxidative polymerization is carried out in the toluene solvent and at least one solvent selected from the group consisting of an alcohol, an aliphatic hydrocarbon, a ketone and an ester in an amount of less than 50% by weight based on the total of the toluene solvent and the at least one solvent.

5. A process according to claim 1, wherein the phenylene ether oligomer water-soluble organic solvent solution contains the aromatic hydrocarbon in an amount of 5% by weight or less based on the phenylene ether oligomer.

6. A process according to claim 1, wherein the toluene solvent replaced with the water-soluble organic solvent is reused in the step of oxidative polymerization after water dispersed therein is removed.

7. A process according to claim 1, wherein in the step of bringing the phenylene ether oligomer solution after the replacement with the water-soluble organic solvent into contact with the water, the amount of the water-soluble organic solvent based on the total amount of the water-soluble organic solvent and the water is 20 to 80% by weight.

8. A process according to claim 1, wherein the water-soluble organic solvent is recovered from a remaining solution obtained when the phenylene ether oligomer is precipitated as particles from the phenylene ether oligomer water-soluble organic solvent solution, and the recovered water-soluble organic solvent is reused for the replacement of the toluene solvent of the phenylene ether oligomer used for the oxidative polymerization.

9. A process according to claim 1, wherein the phenylene ether oligomer precipitated as particles is washed with an alcohol aqueous solution containing a mixture of a water-soluble alcohol and water.

10. A process according to claim 9, wherein the water-soluble alcohol is recovered from the alcohol aqueous solution after washing the phenylene ether oligomer particles and the recovered water-soluble alcohol is reused as a wash for the phenylene ether oligomer.

11. A process according to claim 9, wherein the concentration of the alcohol aqueous solution is adjusted such that the solubility of the phenylene ether oligomer in the alcohol aqueous solution is 5 g/100 g or lower.

\* \* \* \* \*